United States Patent

[11] 3,630,806

| [72] | Inventors | Nobuo Kitajima; |
| | | Hisao Inoue, both of Konosu-shi, Japan |
| [21] | Appl. No. | 740,617 |
| [22] | Filed | June 27, 1968 |
| [45] | Patented | Dec. 28, 1971 |
| [73] | Assignee | Asahi Shiko Kabushiki Kaisha |
| | | Tokyo, Japan |
| [32] | Priority | June 28, 1967 |
| [33] | | Japan |
| [31] | | 42/41027 |

[54] APPARATUS FOR THE MANUFACTURE OF PACKAGING MATERIAL HAVING A CORRUGATED CORE SHEET OF SYNTHETIC RESIN
6 Claims, 3 Drawing Figs.

[52] U.S. Cl.................................................... 156/472, 156/210
[51] Int. Cl...................................................... B31f 1/22, B31f 1/28
[50] Field of Search........................................... 156/470, 471, 462, 205, 208, 210, 594, 311, 472

[56] References Cited
UNITED STATES PATENTS

| 3,189,502 | 6/1965 | Chtze | 156/210 |
| 3,210,227 | 10/1965 | Shichman | 156/311 X |
| 3,346,438 | 10/1967 | Chavannes | 156/210 |
| 2,960,146 | 11/1960 | Williams | 156/471 X |
| 3,004,880 | 10/1961 | Lord | 156/470 X |
| 3,142,599 | 7/1964 | Chavannes | 156/210 |

*Primary Examiner*—Benjamin A. Borchelt
*Assistant Examiner*—J. J. Devitt
*Attorney*—Sughrue, Rothwell, Mion, Zinn & Macpeak ABSTRACT: The invention relates to improvements in a machine for the manufacture of a continuous corrugated composite sheet comprising a corrugated core and at least a liner sheet. For attaining a waterproofness, the core sheet is made from a thermoplastic synthetic resin sheet. At least one of the liner sheet is made also of a thermoplastic resin material. The invention provides a simple attachment for the manufacture of the corrugated composite sheet of the above kind, to a conventional machine used for the manufacture of corrugated composite paper boards, said attachment comprising a liquid cooling mechanism for cooling the main corrugating roll positively driven and kept in cooperation with an auxiliary corrugating roll for the core sheet, thereby cooling the main roll in place of conventional heating and establishing a temperature difference of at least 20° C. between the auxiliary roll and the main roll.

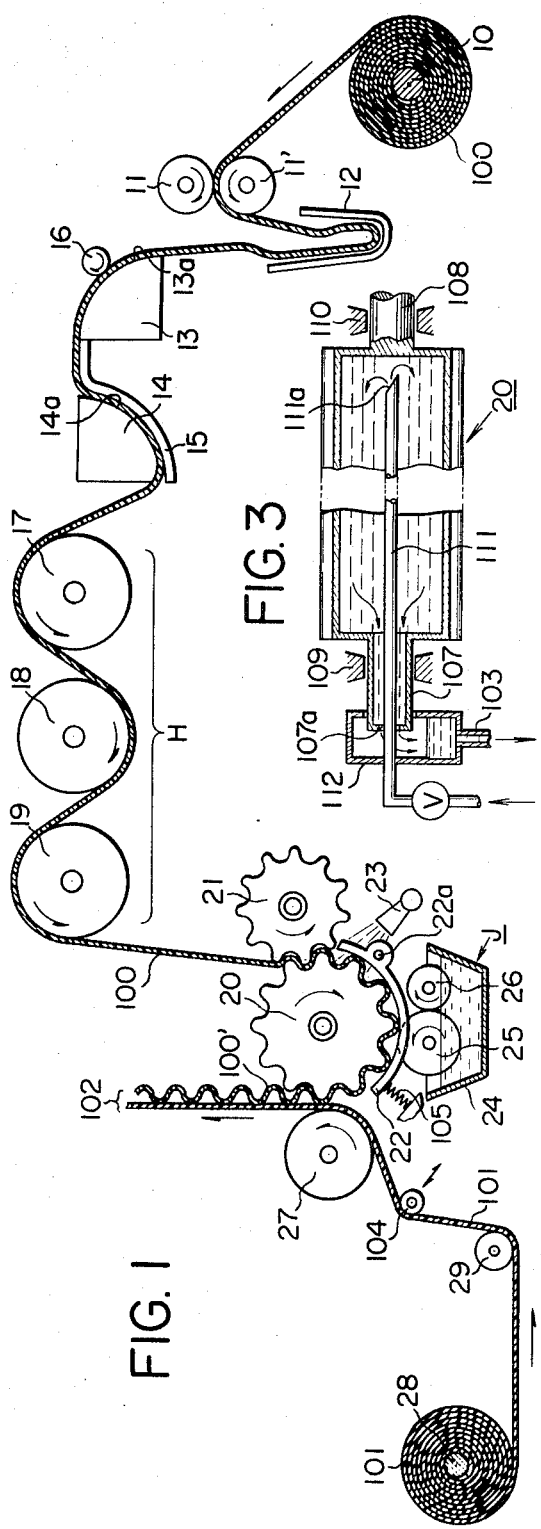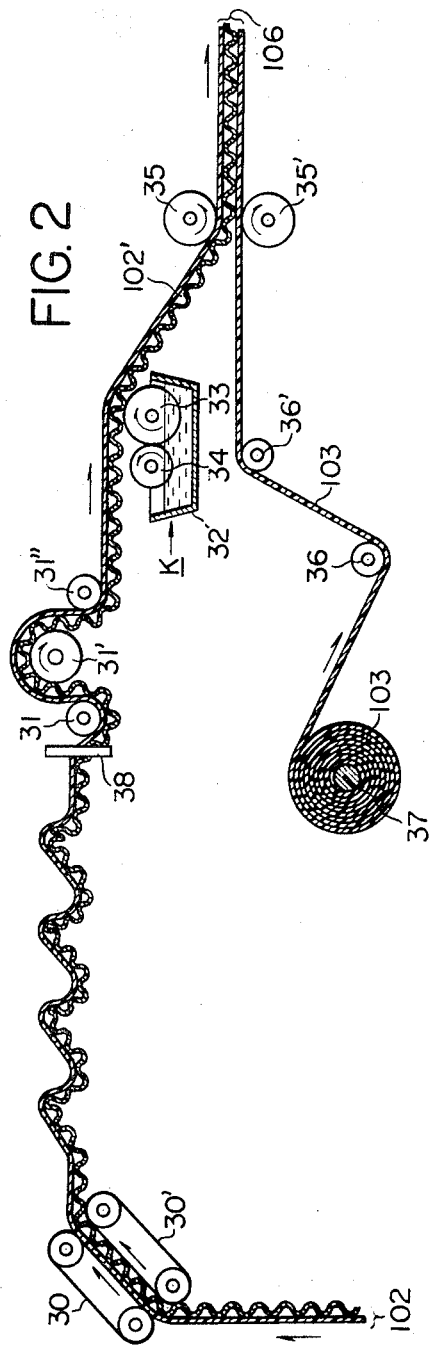

APPARATUS FOR THE MANUFACTURE OF PACKAGING MATERIAL HAVING A CORRUGATED CORE SHEET OF SYNTHETIC RESIN

This invention relates to improvements in and relating to an apparatus for the manufacture of a packaging material composed of a synthetic and corrugated core sheet covered by at least a plain cover sheet and, preferably by a backing sheet glued to said core. One or both of said cover and backing sheets may also be of synthetic material. The aforementioned composite packaging material will be referred to as "corrugated sheet" and said cover and backing sheets will thereof be referred to as "liner sheets" throughout the present specification.

Generally speaking, the corrugated sheets have been manufactured from hard paper boards glued with each other. Especially recently, such corrugated paper sheets have found their broad use in packaging various commodities and foodstuffs. A grave drawback of these corrugated paper sheets is the lack of moistureproofness which has prevented these sheet stocks from being utilized for packaging water-containing natural and artificial products such as raw fishes, green vegetables and the like.

Various proposals have therefore been made to provide an efficient and high-speed manufacturing plant of improved corrugated sheet having a core and liners at least one of which, especially the core, is made of a plastic material, for providing an efficient waterproofness while reserving the physical strength of the corresponding, totally paper-made corrugated sheet.

It has been however experienced with a grave difficulty in the formation of the corrugated core sheet from thermoplastic material.

In order to avoid such difficulty, a proposal has been made to use a heated roll with a corrugated peripheral surface arranged to cooperate with a pressure roll having a similar corrugated peripheral surface for squeezing a thermoplastic sheet between said both surfaces while the rolls are kept in rotation and the core stock sheet is being conveyed therebetween. Polyethylene or the like liner synthetic resin sheets are united with the thus corrugated core sheet by spot welding means utilizing a high frequency current.

It was further proposed to extrude the corrugated core from an extrusion die in the direction perpendicular to the corrugation. According to a still further proposal, a composite corrugated sheet as a whole is extruded from a die.

According to our experiments, however, it is very difficult to weld a corrugated core made of a thermoplastic material under an ample mechanical pressure for bringing about the desired high frequency welding with one or both of the liner sheets, because the thus heated core or the liner is subjected to a considerable deformation under heated and plastisized condition.

It has been further found that the extrusion process has the drawback of lower operational speed, in spite of the large amount of the initial investment for the manufacturing plant.

It is therefore the main object of the present invention to provide an apparatus for the continuous manufacture of a corrugated composite sheet at least the corrugated core of which is composed of thermoplastic material such as polystyrol, polyethylene, polyvinyl chloride or the like, at a high operating speed without inviting any appreciable undesirous deformation of the products.

A further object is to provide an apparatus of the above kind comprising a simple attachment adapted for effectively manufacturing said kind of composite corrugated sheets, thereby providing a possibility for converting a conventional corrugated paperboard machine into the machine intended to provide by the present invention.

A still further object is to provide an apparatus of the above kind, capable of operating at a higher manufacturing speed than that of the extruding machine.

The broadest aspect of the present invention for attaining the above objects resides in a corrugating machine comprising: a first feed mechanism for supplying a thermoplastic sheet stock at a constant speed under a predetermined tension; a preheating mechanism for said core sheet kept in rolling contact therewith, comprising a plurality of rotating rolls adapted to be heated at successively higher temperatures and rotated with successively higher peripheral speeds when seen in the advancing direction of said core sheet; a main corrugating roll; an auxiliary corrugating roll kept in meshing with said main roll, the core sheet delivered from said preheating mechanism being fed between said main and auxiliary corrugating rolls; means provided in close proximity of said main roll for supplying a sticking agent onto the corrugated ridges of said core sheet while it is being corrugated on said main roll; and a heated roll arranged for working cooperation with said main roll for supplying a liner sheet, preferably made of synthetic resin material, and bringing it in an overlapped condition on the corrugated sheet on its surface applied with said sticking agent, said machine being characterized by the provision of liquid-cooling means attached to said main roll and adapted for cooling said corrugated core sheet while being corrugated and carried along on and by said main roll through the cooling of the latter from inside.

AS will become more clear from the detailed description to be set forth, the invention an be carried into effect in the form of a simple attachment unit attached to a conventional machine broadly used for the manufacture of corrugated paper boards.

These and further objects, features and advantages of the invention will become more apparent when read the following detailed description of substantially a preferred embodiment of the invention by reference to the accompanying drawings. It should however be stressed expressly that the embodiment is only for the illustrating purpose and should not be construed as a definition of the invention.

In the drawings:

FIG. 1 is a schematic and explanatory sectional drawing illustrative of the inventive machine.

FIG. 2 is a similar view to FIG. 1, adapted for combination with the machine shown therein when it is desired to manufacture a composite corrugated sheet having two liner sheets in place of one.

FIG. 3 is a detailed view of a liquid cooling mechanism fitted to the main corrugating roll, representing the main feature of the present invention.

Referring now the accompanying drawings, numeral 10 represents a rotatably mounted core around which is mounted a rolled stock of core sheet 100. This sheet is guided between a pair of feed rolls 11 and 11', preferably of the expansion type, and fitted each with a rubber lining on its peripheral surface, although not specifically shown, and then fed into a provisional receiver 12, having a U-shaped cross section, in order to provide a certain amount of allowance stock of the core sheet 100 within the whole core sheet feed arrangement. This allowance stock is intended for compensation of a sudden pull accidentally applied in the sheet from a certain or other unusual cause encountered occasionally in the feed arrangement. If not, crimps may occur on the core sheet. The sheet 100 is then conveyed successively onto the curved surfaces 13a and 14a formed on the stationary friction members 13 and 14, respectively, which are arranged in a zigzag way as shown, for providing in combination an effective braking force onto the travelling sheet stock 100.

The friction member 13 cooperates with a rotatable pressure or pinch roll 16 for initiating an accurate feeding of the sheet 100 at a predetermined constant speed. Generally speaking, this pinch roll 16 should be of the positively driven type. But, when the rotational speed of the first roll at 17 of the preheating stage, generally shown at H in FIG. 1, is accurately adjusted to the desired constant feed rate of the core sheet, the roll 16 may be of the free running type. This roll 16 is adjustably and resiliently pressed against the curved guide surface 13a, although the pressure means for this purpose has been omitted from the drawing on account of its very polularity. If desired, the roll 16 may be replaced by a pair of small rollers which are positioned in close proximity to the both longitudinal edges of the sheet, so as to determine the feed direction of the sheet, although not shown.

Second friction member 14 cooperates with a resilient guide plate 15 which may comprise a backing resilient metal sheet lined with a rubber and the like frictional surface layer, although not shown. This guide plate 15 has a curved configuration when seen in its side elevation shown in FIG. 1 and its root portion is fixedly attached to the first friction member 13. The provision of this guide 15 serves for the prevention of otherwise developable crimps on the sheet 100 in the course of its passage between the members 13 and 14, as well as, along the second member 14.

The preheating mechanism H comprises a plurality of, herein shown three in the present embodiment, successive preheating rolls, shown at 17, 18 and 19, respectively. These rolls are heated to successively elevated temperature, from 80°–150b$L$ C., as an example, and adjusted to successively increased peripheral speeds, to have a speed differential 1–3 percent for each successive pair of the rolls. The heating means may be in the form of electrical resistant elements, hot air circulation means, superheated steam heating means or the like, which have been omitted from the drawing on account of its very familiar nature. Since the preheating rolls 17, 18 and 19 serve for feeding the core sheet, the rotational surface speeds of rolls 11, 11′, 16 and 17 should preferably be adjusted to have a predetermined common speed such as 60 m./min.

The corrugating mechanism comprises a main corrugating roll 20 which is rotatably mounted on the machine frame, not shown, and positively driven at a predetermined speed and constantly cooled so as to have a predetermined surface temperature such as 10°–50° C. The preferable roll temperature may be in the order of 20°–30° C. in the mean. The rotational surface speed of the main roll 20 is set to a speed higher 1–3 percent than that of the final stage preheating roll 19.

The liquid cooling means provided for the main corrugating roll 20 is specifically shown in its longitudinally sectional view in FIG. 3. The roll 20 is provided with shaft parts 107 and 108 formed rigidly therewith and rotatably mounted in respective bearings 109 and 110. The former shaft part 107 is hollow and receives and elongated stationary tube 111 which extends a substantial distance into the interior, the innermost end of said tube opening at 111a in close proximity to the right-hand end wall of the roll 20. The opposite or inlet end of the tube 111 is connected through a regulating valve V to a cooling liquid supply source, not shown, which may be a city water main.

As may be judged from several arrows shown in FIG. 3, the cooling liquid is supplied from the source through valve V and tube 111 to the interior space of the main forming roll 20 for performing effective cooling thereof.

The liquid, having effected the cooling of the roll, is discharged from the interior thereof through the hollow space of the shaft part 107, a ring gap 107a formed in the outer end thereof and around the supply tube 111, into a stationary reservoir 112 kept in fluid communication with said tube hollow space. The liquid is finally discharged through a discharge piping 103 which is kept in fluid communication with the interior space of the reservoir 112.

For intensifying the cooling effect, the supplying water may be precooled by a refrigerating machine, although not shown.

A matingly arranged auxiliary corrugating roll 21 is also rotatably mounted on the machine frame and kept in engagement with the main roll 20 through the sheet 100 and at a higher temperature such as 60° C. or less than the mating main roll 20.

For this purpose, the roll 21 maybe fitted with conventional electric or steam heating means arranged therein, although not shown. As seen, the auxiliary roll 21 should preferably have a considerably smaller diameter than that of the main roll 20, and normally positioned at a slightly higher level than the main roll 20.

A guide comb 22 covers, yet with a slight gap for easy and smooth passage of the sheet 100 which is being corrugated, a substantial lower surface of the main roll 20 as to prevent the corrugated sheet from following the rotating auxiliary roll 21. The comb 22 extends nearly from the delivery end of the engaging zone between the main and auxiliary rolls 20 and 21 along the lower peripheral surface of the main roll to a point near the engaging zone between the main roll and a pressure roll 27 for a liner sheet 101 to be described. Although not specifically shown, the guide comb 22 consists of a number of curved strips united rigidly together and commonly mounted pivotably at 22a by a pivot shaft, not shown, which is rotatably mounted on the machine frame. It is naturally preferable to fit an urging spring to the comb, as shown in a simplified manner at 22, for pressing the comb with a slight resilient pressure towards the main roll 20.

In a proximity to the comb 22, there is provided a cooling fan shown in a highly simplified manner at 23, the delivered air therefrom being forced to pass through the gaps between each pair of the comb strips and then brought into contact with that part of the corrugated core strip which is traveling through the gap formed between the main roll surface and the comb, for aircooling the corrugated core.

Below the main roll 20, there is provided a supply mechanism J of sticking agent which is contained within a stationary reservoir tank 24 fitted with a rotatingly coating rolls 25 only one of which is seen in FIG. 1, said rolls 25 cooperating with an equal number of doctor rolls 26 seen only one from FIG. 1.

When this comb 22 consists of a number of parallel strips sheet was hinted hereinbefore, each of the coating rolls is arranged in registration with the comb gap for performing the required coating function. If, however, the comb strips are only two in their number and placed along the longitudinal edge portions of the corrugated sheet, these rolls 25 may preferably united into one or two elongated cylinders. This will apply to the case of the doctor rolls 26. As seen, the coating roll or rolls 25 and the doctor roll or rolls 26 are partially dipped in the bath of the sticking agent contained in the tank 24.

Numeral 28 denotes a core rotatably mounted on the machine frame and mounts thereon a roll of liner sheet 101 which may be paperboard sheet or synthetic resin sheet as the case may be. In the following, however, this sheet 101 will be described as the resin sheet, because this feature is highly recommendable in practice of the invention.

The liner sheet 101 is taken out from the roll on the core 28 and then guided by a guide roll 29 and an adjustable guide roll 104 which are freely rotatable on the machine frame. As was briefly hinted hereinbefore, the liner sheet 101 is pressed by pressure roll 27 against the surface of the corrugated and cooled core sheet 101′ which surface is just wetted at its corrugated ridges by the sticking agent described hereinbefore, thereby providing a rigidly united composite corrugate sheet 102 comprising said both sheets 100′ and 101 firmly sticked together. This kind of corrugate sheet 102 is naturally used as per se for various packaging purpose. It is however very convenient when this composite sheet 102 is further united with a second liner sheet 103 by means of an attachment shown in FIG. 2.

In the attachment shown in FIG. 2, the thus corrugated composite sheet 102 are fed between a pair of mutually cooperating conveyor means 30 and 30′. Then the sheet 102 is guided through a stationary guide 29 and through a guide rolls 31 and through a guide rolls 31, 31′ and 31″ which are positively driven as shown by arrows and arranged in a zigzag form as shown for providing a proper tension to the composite sheet 102. The sheet 102 is passed through a coating unit comprising a stationary reservoir tank 32 containing a mass of a properly selected sticking agent; a coating roll 33 and a doctor roll 34 which are similar to those described hereinbefore with reference to 24, 25 and 26, respectively, for supplying the sticking agent onto the corrugated ridges. The thus coated sheet 102' is fed between a pair of positively riven pressure rolls 35 and 35'.

On the other hand, the liner sheet 103 is fed from the roll mounted on its core 37, upon being guided by a pair of separately mounted guide rolls 36 and 36', to said roll pair 35-35' and stuck onto the corrugated and pasted surface of the composite sheet 102', so as to provide from the roll pair a well-defined composite sheet 106 comprising a corrugated core of thermoplastic synthetic resin and two loner sheets which may preferably be equally made of synthetic resin.

EXAMPLE 1

Now assuming that it was intended to provide a tertially composite corrugated sheet consisting of a corrugated core sheet, such as shown at 100', and two liner sheets 101 and 103, all sheets being consisting of a thermoplastic resin, preferably polystyrol.

Rotational surface speeds of rolls, 11, 11', 16 and 17 were so adjusted to feed the core sheet 100, 0.1 mm. thick, at a constant speed of 18 m./min. from the roll on the core 10. The first preheating roll 17 was kept at 80° C. the second roll 18 at 110° C. and the third roll 19 at 130° C. (the softening point of polystyrol being 60°-130° C.), respectively.

The surface speed of the second roll 18 was adjusted to 19.4 m./min; the third roll 19 to 19.6 m./min, for compensation of the thermal expansion of the core sheet. In this way, the core sheet was heated to 75°-90° C., depending upon the ambient temperature, and fed to the corrugating roll pair 20-21. The main roll 20 was rotated at a speed of 20 m./min and cooled from inside to 30° C., while the auxiliary corrugating roll 21 was kept at 80° C. As was ascertained practically, this order of temperature difference: 50° C. was sufficient to perform the required corrugation of the core sheet and to prevent the corrugated sheet form sticking upon the corrugating surface of the main forming roll 20. The provision of the cooling air fan 23 accelerated the cooling-down of the corrugated core 100'. But, if necessary, this fan can be dispensed with.

With thicker core sheet and with higher feed rate thereof, the heated temperatures of preheating rolls 17, 18 and 19 must be increased from those as above specified. Under these conditions, the temperature difference between rolls 20 and 21 should naturally be increased.

Thickness of the core sheet may be increased to as high as 2 mm., while the minimum thickness may be set to 0.03 mm.

If the core sheet is made from hard polyvinyl chloride, its operating temperature at the main roll 20 may preferably be set to 50°-75° C.

In the course of the corrugating step under the cooperation of the forming rolls 20-21, sticking agent was applied by means of the coating unit shown at J. AS the sticking agent, a quick-drying paste was used. A preferred paste is polystryrol waste which is taken from the waste products from the process and dissolved in toluol. Preferably, the solvent for this purpose is selected from those belonging to the aromatic family or chlorinated solvents.

The thus corrugated and wetted core sheet was united under pressure with the second sheet 101, which was polystyrol in this case as was referred to above, substantially at the delivery extremity of the main forming roll 20. Since the effective component of the sticking paste was same as the material for both sheets 100 and 101, the stuck joint therebetween was rigid and perfect.

Next, the third liner sheet 103, equally made of polystrol, was added to the aforementioned two component corrugated composite sheet 102.

The feeding speeds of conveyor means 30, 30', feed rolls 31, 31' and 31'' and delivery and pressurizing rolls 35, 35' were set to commonly 20 m./min. The fed composite corrugated sheet was applied with a proper amount of sticking agent at the place of a coating unit K (shown in FIG. 2) as in the same way with the foregoing unit J.

The thickness of the liner sheets 101 and 103 where common and amounted to 0.2 mm., which may be however increased to about 2.0 mm., under increased temperature difference at the place of the corrugating rolls 20-21.

In this way, the desired tertially composite, all polystyrol composite corrugated sheet 106 was delivered from the roll pair 35-35' substantially at a rate of 20 m./min.

For carrying out the invention, it is highly important to control the temperature conditions so that the sheets 100 and 101 meet together at a predetermined temperature such as 80° C.

EXAMPLE 2

The thickness of each of the sheet stocks, 100, 101 and 103, polystyrol, was selected to 0.2 mm, and the rotational speeds of rolls, 11, 11', 15, 16, 18, 19, 20 and 21 were adjusted so as to establish the feed rate of the core sheet 100 in contact with the main corrugating roll 20 being set to 60 m./min.

Temperatures of rolls 17-19 were adjusted to 100° C., 120° C. and 150° C., respectively.

The main roll 20 was kept at 20° C., and that of the anxiliary roll 21 was adjusted to 80° C. (If necessary, heating means for said aux. roll 21 can be dispensed with).

In this way, the desired high manufacturing speed of 60 m./min was attained.

While specific embodiments of the invention have been shown and described in detail to illustrate the application of the inventive principles, it will be understood that the invention may be embodied otherwise without departing from such principles.

We claim:

1. A machine for making a laminate of a synthetic resin corrugated sheet and a substantially uncorrugated liner sheet, the machine comprising a main corrugating roll, an intermeshing auxiliary corrugating roll, means to heat synthetic resin sheet stock and to feed the heated stock to a position between the main corrugating roll and the intermeshing auxiliary corrugating roll in such a way that the sheet stock passes part way around the main corrugating roll and becomes corrugated, means to apply an adhesive to the sheet stock while the sheet stock passes around the main corrugating roll, a heated roll adjacent the main corrugating roll, means for supplying the liner sheet to a position between the main corrugating roll and the heated roll, whereby to join the liner sheet to the corrugated and adhesive-coated sheet, and means to cool the interior of the main corrugating roll by circulation of a cooling liquid to prevent the corrugated sheet form adhering to the main corrugating roll and to maintain the main roll at a temperature lower than that of the auxiliary roll.

2. A machine as claimed in claim 1 in which the means to cool the interior of the main corrugating roll comprises a tube projecting into a cavity in the main corrugating roll for the supply of cooling liquid, and an exit aperture in the main roll so that the cooling liquid may be introduced into the cavity from the tube and caused to flow along the cavity walls, thereby cooling the main roll, the cooling liquid ultimately leaving the cavity through the exit aperture.

3. A machine for making a laminate of a synthetic resin corrugated sheet and a substantially uncorrugated liner sheet, the machine comprising a first feed mechanism for supplying synthetic resins sheet stock at a constant speed under a predetermined tension; a preheating mechanism for said sheet stock comprising a plurality of rotating rolls adapted to be heated at successively higher temperatures and rotated in contact with the sheet stock at successively higher peripheral speeds in the advancing direction of said sheet stock; a main corrugating roll; an auxiliary corrugating roll in mesh with said main roll, said preheating mechanism feeding said sheet stock between said main and auxiliary corrugating rolls; means provided in close proximity to said main roll for supplying an adhesive onto the corrugated ridges of said sheet stock while it is being corrugated on said main roll; and a heated roll arranged for working cooperation with said main roll or applying the liner sheet to the corrugated sheet on the surface of the corrugated sheet applied with said adhesive; means for supplying the liner sheet between said heated roll and said main roll; and cooling means cooperable with said main roll and adapted for cooling said sheet of synthetic resin material while being corrugated to prevent it from adhering to said main roll.

4. A machine as claimed in claim 3 in which the temperature of the liner sheet and that of the corrugated sheet is kept at a substantially constant value such as 80° C.

5. A machine as claimed in claim 3, further comprising means to apply adhesive to the ridges of the other surface of the corrugated sheet, and means to apply a second liner sheet to said other surface of the corrugated sheet.

6. A machine as claimed in claim 3 wherein said cooling means serves to cool said main roll by circulating a cooling liquid in the interior of said main roll.

* * * * *